United States Patent
Bayt (10) Patent No.: US 7,272,698 B2
(45) Date of Patent: Sep. 18, 2007

(54) HEAP MEMORY MANAGEMENT

(75) Inventor: Jack M. Bayt, Clovis, CA (US)

(73) Assignee: Autodesk, Inc., San Rafael, CA (US)

( * ) Notice: Subject to any disclaimer, the term of this patent is extended or adjusted under 35 U.S.C. 154(b) by 239 days.

(21) Appl. No.: 10/800,268

(22) Filed: Mar. 12, 2004

(65) Prior Publication Data

US 2004/0186976 A1    Sep. 23, 2004

Related U.S. Application Data (60) Provisional application No. 60/455,899, filed on Mar. 19, 2003.

(51) Int. Cl.
*G06F 17/30*    (2006.01)
(52) U.S. Cl. .................. 711/202; 707/101; 707/205
(58) Field of Classification Search ............ 711/202; 707/101, 205
See application file for complete search history.

(56) References Cited

U.S. PATENT DOCUMENTS

| | | | |
|---|---|---|---|
| 5,652,865 A * | 7/1997 | Rawlings, III | ............ 711/171 |
| 5,734,892 A * | 3/1998 | Chu | ............ 707/101 |
| 5,864,867 A | 1/1999 | Krusche et al. | |
| 6,237,072 B1 | 5/2001 | Houlsdworth | |
| 6,725,244 B1 * | 4/2004 | Bonwick | ............ 707/205 |
| 2004/0068503 A1 * | 4/2004 | Peckham | ............ 707/100 |

\* cited by examiner

*Primary Examiner*—Donald Sparks
*Assistant Examiner*—Jared Rutz
(74) *Attorney, Agent, or Firm*—Gates & Cooper LLP (57) ABSTRACT

A method, apparatus, and article of manufacture provide the ability to efficiently and effectively manage memory. A file is broken into multiple memory blocks that are managed as nodes in a heap tree. A request to access memory at a linear file address is received. The linear file address is then translated to the appropriate heap block reference to complete the memory access. Additionally, a tri-linked list/tree of deallocated memory units available for use by the heap may be used. A first link points to units smaller than a current block size, a second link points to units equal to the current block size, and a third link points to units larger than the current block size. When a request for memory is received, the tree is traversed to find a unit that satisfies the request and the appropriate unit in the free list is allocated.

18 Claims, 6 Drawing Sheets

FIG. 7

HEAP MEMORY MANAGEMENT

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/455,899, filed Mar. 19, 2003, by Jack M. Bayt, entitled "HEAP MANAGEMENT."

BACKGROUND OF THE INVENTION

1. Field of the Invention

The present invention relates generally to managing memory, and in particular, to a method, apparatus, and article of manufacture for using a heap to manage memory.

2. Description of the Related Art

Files and file systems provide mechanisms for long term storage of an application and are supported by most operating systems. Programming languages usually provide a layer application programming interface (API) to use to access files that then internally uses the underlying operating file system. Generally, in the prior art, a file and file systems are linear in nature (i.e., they are accessed in a linear manner). Thus, the application is able to write data to a point (or read data from a point) in a sequential manner. However, file systems may also be randomly accessed which allows one to "seek" to a point but from that point, access is sequential in nature. For example, a file pointer may be randomly set to point to the location where data is either written to or read from in a linear/sequential manner. Accordingly, while the file systems are linear in access, the file pointer may be positioned randomly.

Once a file pointer is set, an application is able to read or write data in a linear manner. However, the application is responsible for keeping track of what data is stored at what file pointer position. Further, when data is inserted into the linear file, the entire file after the insertion point must be rewritten. Accordingly, the prior art requires applications to maintain significant knowledge about file systems while inserting and removing data inefficiently.

Figure 1:
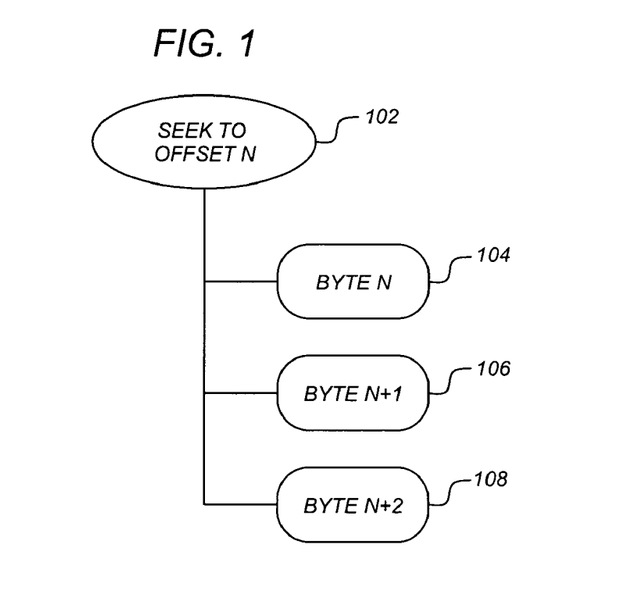
FIG. 1 illustrates the use of a prior art linear file access system.

FIG. 1 illustrates the use of a prior art linear file access system. The file system allows a user to seek 102 to a particular memory offset location N (thereby providing the ability to randomly position a pointer). Thereafter, the file is linear in nature stored at bytes N 104, N+1 106, and N+2 108.

Figure 2:
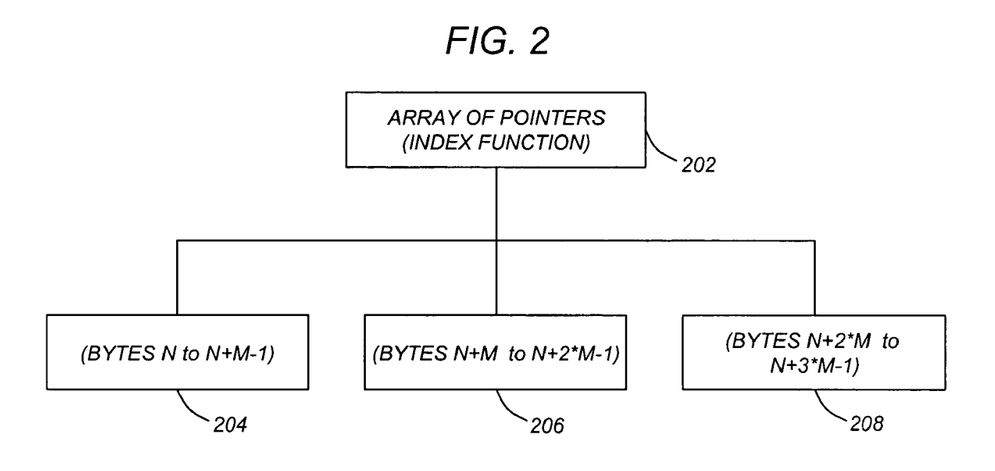
FIG. 2 illustrates a prior art file system controlled by a linear access array.

The physical file system used by many operating systems is often a collection of blocks with linkage information between the blocks that is controlled by a linear access array. FIG. 2 illustrates a prior art file system controlled by such a linear access array. For a given offset in the file, the index array of pointers 202 is used to point to the block 204-208 that contains the given data. The requested data may then be accessed in the block.

When storing and retrieving files, memory is consumed. Various methods have been developed for managing memory. For example, some prior art applications may utilize heaps to manage memory. A heap is a term used to describe a pool of memory available to an application. Applications request a block of memory from the heap for use (allocation). The application may later release the memory back to the heap (deallocation). The implementation of a heap system is generally a requirement for all operating systems.

A common feature of most heaps is that they keep track of all blocks that were previously allocated and then later deallocated (so they may be reused by later allocation requests). Such a list of deallocated blocks is commonly called a free-list. When an allocation request is made, the heap will attempt to reuse a deallocated block from the free-list prior to requesting new memory from the operating system. In this regard, the free-list is searched for a block that satisfies the allocation request. In the prior art, the free list is searched in a linear manner.

In one prior art example, a heap is broken up into multiple chunks—each representing approximately a megabyte of free memory. In each chunk, the free blocks are stored sequentially. Thus, searching for a particular size or finding the smallest block that will satisfy the desired allocation request is of order N—linear.

The prior art may also utilize a heap configured as a binary tree where each node in the tree represents a block of memory of a certain size. Two links exist for each node. One link points to memory blocks smaller in size while a second link may point to memory blocks of equal or greater size. The problem with such binary free-list trees is that applications tend to have many objects of the same size in the free list. Accordingly, when traversing a binary tree to find a satisfactory block of memory, search times may be near the same as a linear search.

In addition to the above, it is common for programmers to have a coding error that results in a heap being asked to deallocate a block that the heap never allocated. Heaps generally do not detect this kind of error and thus they cause an application to crash. Sometimes, there are different heaps used—one used during development that has significant overhead in integrity checking, and another used for the end product that has no checking. While such a solution may help reduce errors, in many cases, there are significant differences in runtime behavior of an application between development mode and end product mode. Accordingly, what is needed is an ability to quickly and efficiently perform integrity checking at runtime that does not utilize significant overhead.

SUMMARY OF THE INVENTION

Heaps are a term used to describe a method to allocate and manage memory for use by an application. Applications request a block of memory from the heap for use (allocation). Later, the application releases the memory back to the heap (deallocation). Usually, a heap also maintains a free list of those blocks of memory that have been deallocated so they may be reused by later allocation requests.

File systems are a way to manage long term storage for an application. Prior art file systems utilize a file pointer that points to the location where data is either written to or read from in a linear manner. File systems are linear in access but the file pointer may be positioned randomly.

One or more embodiments of the invention combines the concepts of a heap and a file system. Instead of a file pointer, an application requests from the file heap an object of a desired size and then is able to read/write data to that object in a random manner. A file may be broken up into blocks and a tree organization is used to manage the blocks. To insert data into a file, the block is merely broken at the insertion point, and the new block is inserted as a node in the tree. Random access may be simulated by mapping the linear address of a file through the tree structure to map to the actual node used for that block.

In addition, the invention provides for the use of a tri-linked free list. Instead of a linear search, a binary tree is used for the search wherein nodes of the same size are stored outside of the tree. Accordingly, the tri-linked tree only contains a single reference to a particular block size in the free list.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 3:
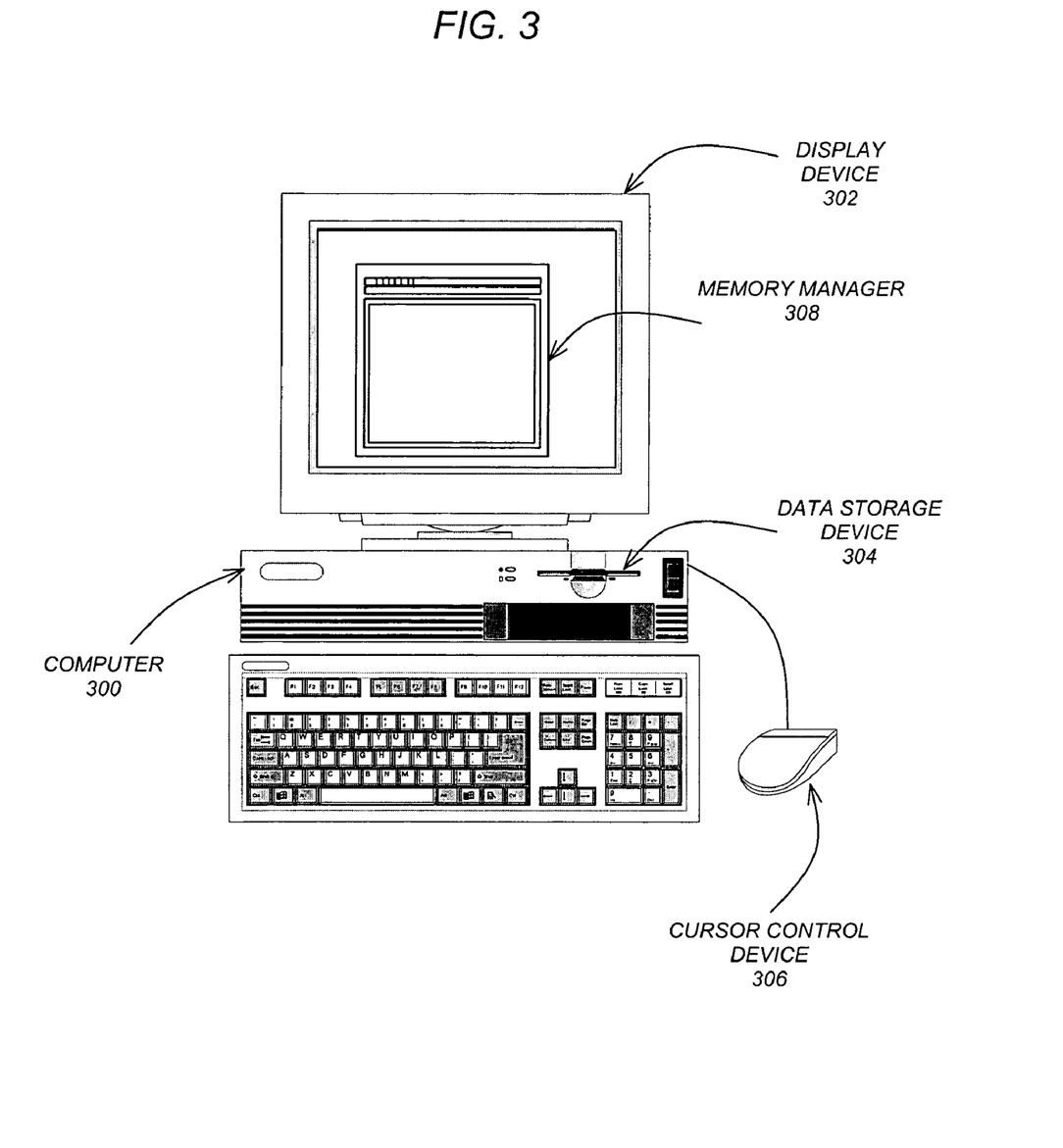
FIG. 3 is an exemplary hardware and software environment used to implement one or more embodiments of the invention.

FIG. 3 is an exemplary hardware and software environment used to implement one or more embodiments of the invention. Embodiments of the invention are typically implemented using a computer 300, which generally includes, inter alia, a display device 302, data storage devices 304, cursor control devices 306, and other devices. Those skilled in the art will recognize that any combination of the above components, or any number of different components, peripherals, and other devices, may be used with the computer 300.

One or more embodiments of the invention are implemented by an operating system or memory manager program 308. Generally, the memory manager 308 comprises logic and/or data embodied in or readable from a device, e.g., one or more fixed and/or removable data storage devices 304 connected direcily or indirectly to the computer 300, one or more remote devices coupled to the computer 300 via a data communications device, etc. Further, the memory manager 308 controls the file system and manages the memory for other applications executing on computer 300.

Those skilled in the art will recognize that the exemplary environment illustrated in FIG. 3 is not intended to limit the present invention. Indeed, those skilled in the art will recognize that other alternative environments may be used without departing from the scope of the present invention.

File System Modeled as a Heap

As described above, with a prior art file system, significant overhead is required to maintain a file system (including knowledge regarding memory offsets). Examples of such prior art file systems include NTFS (NT File System) and/or the FAT (file allocation tables) system. In addition, it is difficult to insert data into the middle of the file without significant overhead. In order to insert data into the middle of a file, you must move all data after the insertion point to a new location in the file to make room for the data to be inserted.

One or more embodiments of the invention combine the ideas of a heap and a file system. The invention maintains a heap that represents the file system. Utilizing a heap in this manner enables an efficient mapping and separation between the logical address used by a file and the physical storage location.

Figure 4:
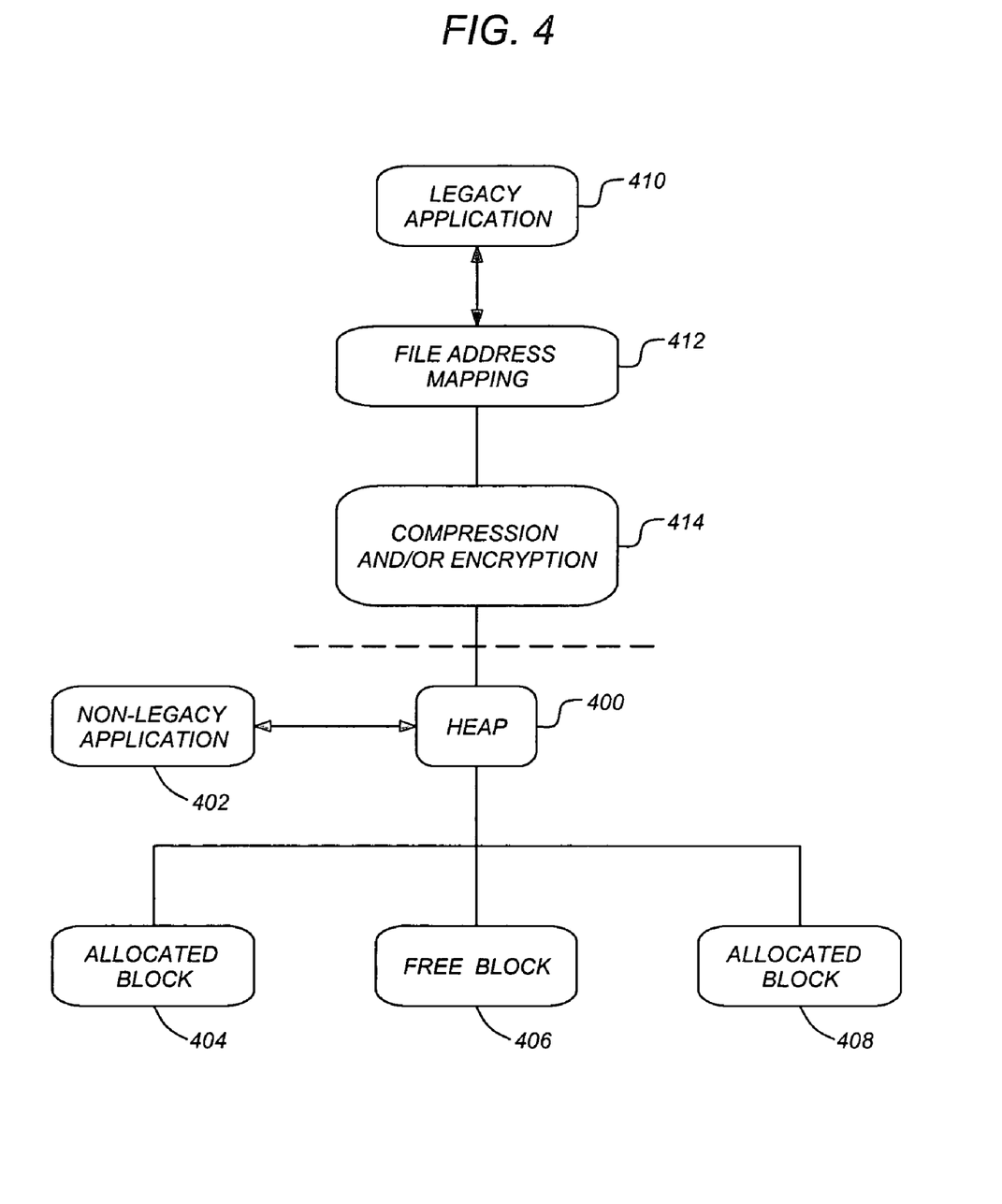
FIG. 4 illustrates the organizational structure for a file system modeled as a heap in accordance with one or more embodiments of the invention.

FIG. 4 illustrates the organizational structure for a file system modeled as a heap in accordance with one or more embodiments of the invention. The bottom portion of FIG. 4 illustrates the heap 400 managing the memory blocks 402-406. Instead of a file pointer, an application 402 may request from the file heap 400, an object of a desired size. The application 402 may then read/write data to that object in a random manner. There is no file pointer since each object is unique and independent. File heap blocks 402-406 may be allocated and deallocated in a random manner, and the file heap 400 maintains all information related to actual location without any knowledge of the application 402. The file heap 400 may physically store the data in a traditional file or in any other manner allowed by the hardware operating system.

Accordingly, instead of an application 402 maintaining pointer and/or offset information, the application 402 merely retrieves an object from the heap 400. The heap 400 therefore manages all of the memory blocks. In this regard, the heap 400 acts as an application programming interface (API) to the application 402. The application 402 may insert data into a file, delete data from a file and perform any desired memory operation without knowledge of the underlying memory or file system status. Accordingly, the file being accessed looks like a heap and does not appear as a linear file for which offset and memory storage must be maintained.

With a file system modeled as a heap 400, the issue arises as to how legacy applications 410 may utilize the new file system. To reprogram existing legacy programs to directly interface with a heap 400 instead of maintaining file offsets and managing the memory may take considerable time and effort. Accordingly, it would be beneficial to allow legacy applications (with minor or no changes) to utilize the new heap-based system while permitting newer applications 402 to interact directly with the heap 400.

One or more embodiments of the invention provide the ability for legacy applications to utilize a heap-based file system. In legacy applications, a file may be accessed in a linear manner. However, the underlying file system may no longer be linear. To allow the application 410 to continue to use linear addressing, the invention provides a file address mapping tree 412 that translates linear file addresses into heap block references. Random access may be simulated by mapping the linear address of a file through the tree structure to map to the actual node used for that block (i.e., the file address mapping tree 412).

Accordingly, when an application 410 requests memory at a particular linear memory address, the file address mapping tree 412 converts the request to a heap block reference which is passed onto the heap 400 for further processing. Thus, while the legacy application 410 appears to be working with a linear memory block, the heap 400 is actually managing the memory. In this regard, by having a heap represent the file system, there is an efficient mapping and separation between the logical addresses used by an application 410 and the physical storage location (managed by the heap 400).

Utilizing the heap 400 to represent the file system, and by having an address mapping layer 412 above the heap 400, the insertion and deletion of address spaces and data in a file are more easily facilitated. Since the file is broken up into blocks, and a heap tree organization 400 is used to manage the blocks, one may insert data into a file simply by breaking the block at the insertion point, and inserting the new inserted data as a node in the heap tree 400.

Thus, to insert data randomly into a file, an existing block 404-408 is merely broken up, the heap tree 400 is updated, and the mapping layer 412 is adjusted. Accordingly, space may be inserted into the file by splitting the file heap 400 at the appropriate place, inserting a new block into the heap 400, at most copying a partial block to a new heap node at the insertion point, and adjusting the file address mapping 412 accordingly.

Areas of a file can be quickly deleted merely be adjusting the file address mapping tree 412 and deleting the associated blocks 404-408 from the heap or reducing the size of partial blocks as needed.

Utilizing the heap 400 to represent a file system also provides additional advantages. For example, one may compress or encrypt (or both) 414 the logical user data prior to saving to the heap 400. Prior art file systems implement compression and encryption by compressing or encrypting an entire file. To access an encrypted file, the entire file is first completely uncompressed or unencrypted and saved to a temporary file. Operations are then performed on the temporary file. When the file is closed, the entire file is recompressed or reencrypted.

By using the heap 400, only the block(s) that contain the physical data that is modified need to be recompressed or reencrypted 414. Accordingly, each block may be independently compressed and decompressed (rather than the entire file). Modified data most likely compresses or encrypts to a new size. In response, the heap 400 may allocate or reuse a block of the appropriate size for the modified data without reprocessing the entire file.

Figure 5:
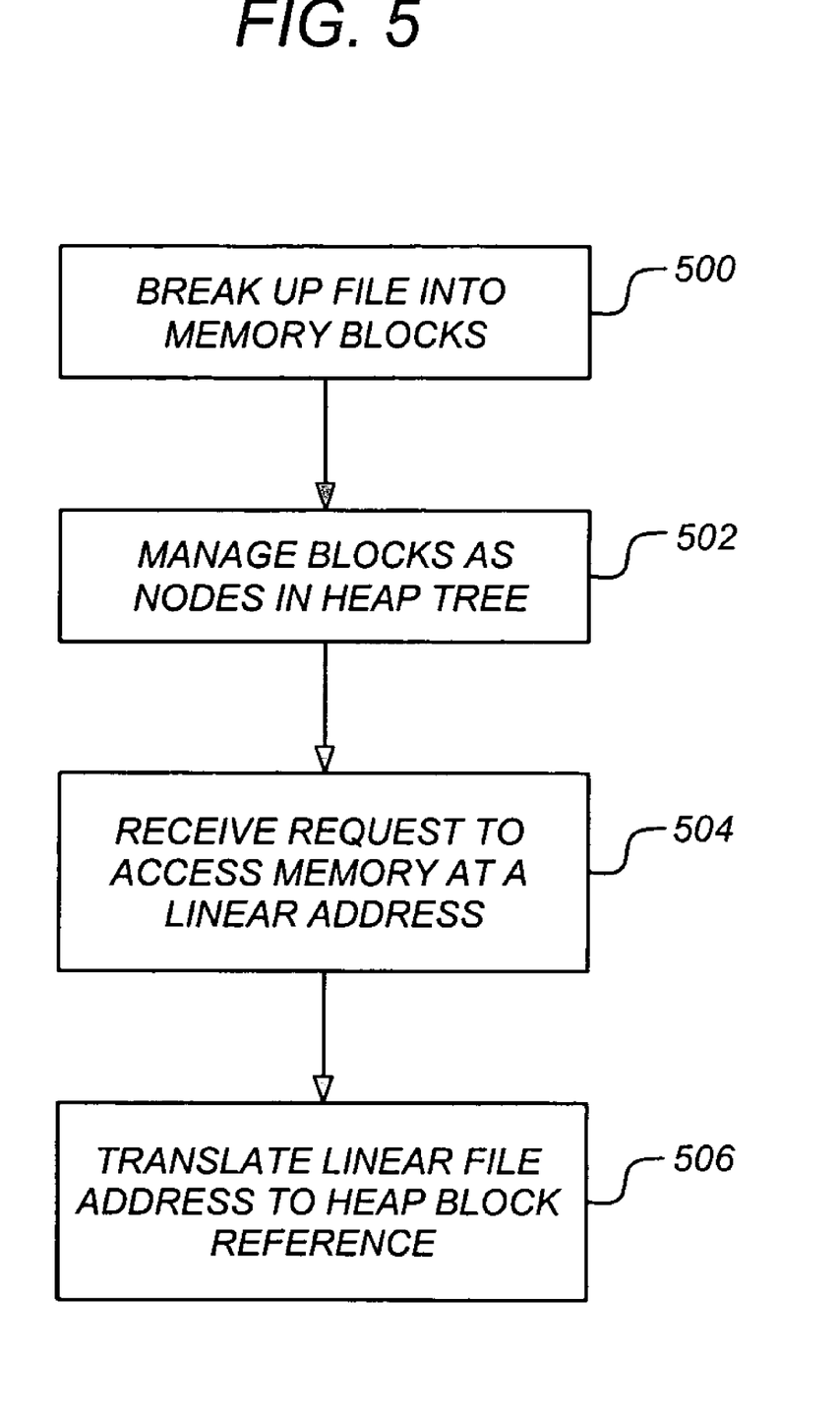
FIG. 5 is a flow chart illustrating the use of a heap as a file system in accordance with one or more embodiments of the invention.

FIG. 5 is a flow chart illustrating the use of a heap as a file system in accordance with one or more embodiments of the invention. At step 500, a file is broken up into two or more memory blocks. At step 502, the memory blocks are managed as nodes in a heap tree 400. Each node in the tree has a heap block reference. At step 504, a request to access memory (e.g., to insert or delete data) at a linear file address is received. At step 506, the linear file address is translated into an appropriate heap block reference to access the memory block.

As described above, the translation may utilize a file address mapping tree 412 that maps linear addresses to heap block references. Further, when a block is inserted or deleted from the heap tree 400, the file address mapping tree 412 is updated. When deleting data from a file, the file address mapping tree 412 is updated by deleting an associated block from the heap 400, reducing a size of partial blocks as needed, and adjusting the file address mapping tree 412 accordingly. When inserting data into the heap 400, the memory blocks may be broken at the insertion point, and new data is inserted as a node in the heap tree 400.

Tri-Linked Free List for a Heap

As described above, heaps may be required to maintain a list of all allocation units that are no longer in use (i.e., deallocated memory units). This list is referred to as a "free list". When a heap 400 is asked to allocate a block, the heap 400 searches the free list first to reuse existing unused blocks before expanding by allocating a new block. Prior art heaps 400 may use either free lists or a linked linear list of free blocks, or a combination of the two. Further, prior art free lists may be maintained in the form of a binary tree. The problem with using a binary tree for a free list is that applications tend to have many objects of the same size in the free list. Such repetitiveness causes binary trees to have search times near the same as a linear search.

One or more embodiments of the invention utilize a tri-linked free list. A tri-linked free list is a tree that points to blocks smaller than itself, larger than itself, and the same size as itself. In this regard, the tri-linked tree may also be viewed as a binary tree, wherein nodes of the same size are stored outside of the binary tree. Such external storage provide the ability for each node in a binary tree to only contain a single reference to a particular block size in the free list.

Figure 6:
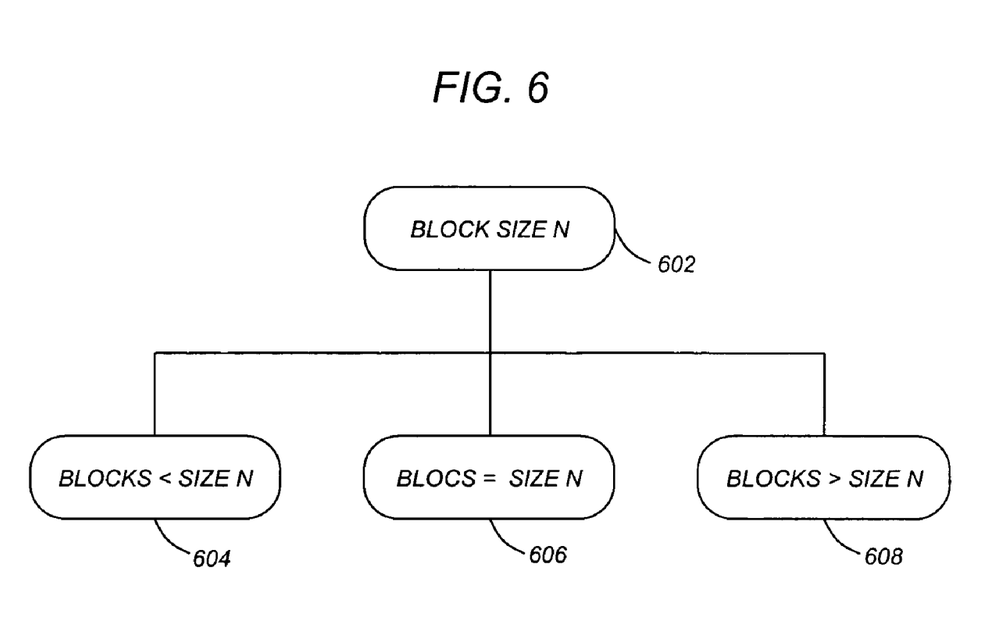
FIG. 6 illustrates a tri-linked free list in accordance with one or more embodiments of the invention.

FIG. 6 illustrates a tri-linked free list in accordance with one or more embodiments of the invention. Each node 602-608 in the tri-linked free list 600 represents a block of memory of a particular size. Three links may be used in the tri-linked free list 600. The first link 602 points to blocks smaller than a current block size N 602. A second link 606 points to blocks equal to the current block size N 602. The third link 608 points to blocks larger than the current block size N 602. Accordingly, in contrast to the prior art, the tree does not need to search all blocks of equal size 606. Instead, the blocks of the same size 606 (which are easily and efficiently linked together) are eliminated from the search. Since allocation sizes tend to repeat, elimination of these equal blocks may dramatically increase search and edit performance.

Figure 7:
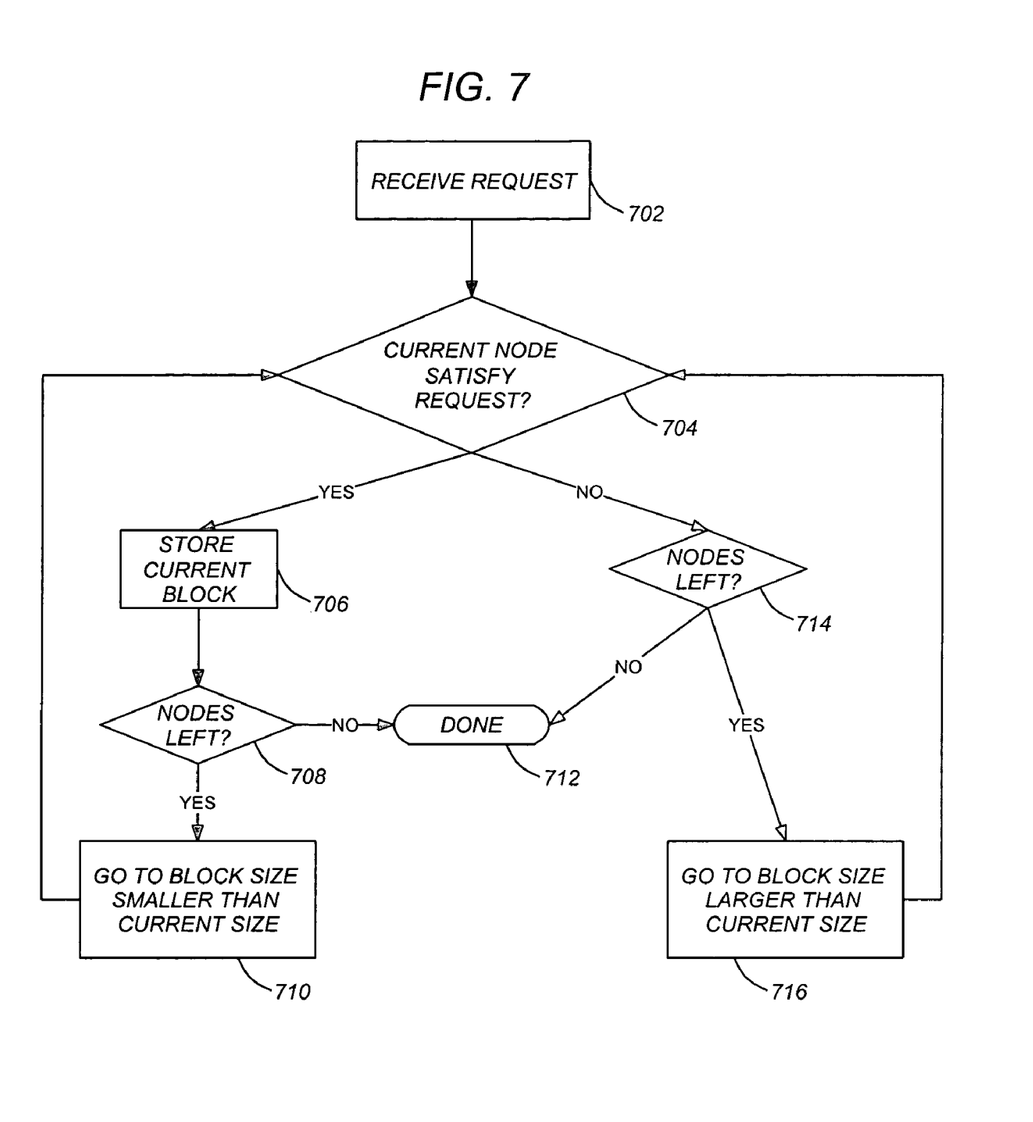
FIG. 7 is a flow chart illustrating the traversal of a tri-linked tree in accordance with one or more embodiments of the invention.

FIG. 7 is a flow chart illustrating the traversal of a tri-linked tree in accordance with one or more embodiments of the invention. The process illustrated in FIG. 7 determines the memory unit that best fits the request. Alternative embodiments may follow the first fit or other analysis for satisfying the memory requested.

At step 702, a request is received for memory. The request indicates that size of the memory block needed. The tree traversal begins with a first/current node. A determination is made at step 704 regarding whether the current node being examined is large enough to satisfy the request.

If the request is large enough, the reference to the current block (i.e., the link to memory blocks equal to the current block size) is stored at step 706. Such a storage may overwrite any reference already stored at that location. The traversal then continues with a determination of whether there are any nodes left at step 708. If there are nodes in the tri-linked free list left, the child link to the memory units smaller than the current block size is followed at step 710 and the process returns to step 704. However, if there are no nodes left in the tree (as determined at step 708), the process is complete at step 712 and the stored link is used to satisfy the memory request (i.e., the memory block pointed to is allocated to the requesting application). Alternatively, if no reference is stored, a new memory block may be allocated.

If the current node is not large enough to satisfy the request (as determined at step 704), a determination is made as to whether the tree has been completely traversed at step 714. If there are no nodes left, the process is complete at step 712 and the stored reference to the appropriate block size is allocated. Alternatively, if there is no reference stored, a new memory block may be allocated/requested from the operating system. If there are nodes left as determined at step 714, the tree traversal continues by advancing to the child node with a block size larger than the current node at step 716 and returning to step 704.

As described above, the entire tree 600 is traversed to find the smallest memory unit/block that satisfies the request. Further, unlike the prior art, the process does not examine or search nodes with memory units of equal size (since they are all linked together). Accordingly, such a repetition is avoided/eliminated.

Heap Controlled Blocks

As described above, the prior art heaps may encounter problems when being asked to deallocate a block that the heap never allocated. Accordingly, a common function of a heap is to be able to easily and efficiently identify blocks that the heap controls. In the prior art, a special signature at the beginning (or end) of a block may be used and compared to a list of blocks controlled by the heap.

One or more embodiments of the invention provides for a heap that maintains a bitmap/bitmask where every bit identifies a range of addresses that are owned by the heap. Prior to any deallocation request, the heap is able to perform a simple shift operation on the address and use the resulting value as an index into the bitmap to see if the address range is owned by the heap.

An example that may utilize this invention is a heap in a Windows™ Win32 environment. Windows™ allocates blocks on 64 k byte boundaries. Thus, the heap may shift the address of any pointer to the right 16 bits to obtain a block index number:

Block Index=Block Pointer>>16.

The resulting index is used into an array of bits (bitmap) to quickly see if the block is owned by the heap or not. A bit is set if the block is used by the heap, and is clear if it is not used.

A shift operation to perform heap ownership of memory blocks is efficient and may be fast enough to use in production builds of a program.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for managing memory, comprising:
   breaking up an existing file into two or more memory blocks for use by an application;
   managing the two or more memory blocks as nodes in a heap tree;
   receiving a request from the application for storage;
   allocating one or more blocks in the file for use by the application; and
   independently compressing one or more of the two or more memory blocks without compressing the entire file.

2. The method of claim 1, further comprising:
   receiving a request to access memory at a linear file address; and
   translating the linear file address to an appropriate heap block reference to access the memory block, wherein the translating utilizes a file address mapping tree comprising a mapping from linear file addresses to heap block references.

3. The method of claim 2, further comprising updating the file address mapping tree when a block is inserted into the heap tree.

4. The method of claim 2, further comprising updating the file address mapping tree when address space is deleted by:
   deleting an associated block from the heap tree;
   reducing a size of partial blocks as needed; and
   adjusting the file address mapping tree accordingly.

5. The method of claim 2, wherein:
   (a) the request to access memory comprises a request to insert data into the file at an insertion point; and
   (b) the method further comprises:
      (i) breaking one of the memory blocks at the insertion point; and
      (ii) inserting the new data as a node in the heap tree.

6. The method of claim 1 further comprising:
   allocating a different one or more memory blocks of a different size when the independently compressing compresses to a new size; and
   independently compressing the different one or more memory blocks without compressing the entire file.

7. A system for managing memory comprising:
   (a) an existing file broken up into two or more blocks of memory for use by an application;
   (b) a heap tree configured to manage the two or more blocks of memory as nodes in the heap tree, wherein:
      (i) the heap tree receives a request from the application for storage;
      (ii) the heap tree allocates one or more blocks in the file for use by the application; and
      (iii) one or more of the two or more blocks of memory are independently compressed without compressing the entire file.

8. The system of claim 7, wherein:
   (i) each node has a heap block reference;
   (ii) the heap tree is configured to receive a request to access memory at a linear file address; and
   (iii) the heap tree is configured to translate the linear file address to an appropriate heap block reference to access the memory block; and wherein the system further comprises a file address mapping tree utilized by the heap tree, wherein the file address mapping tree comprises a mapping from linear file addresses to heap block references.

9. The system of claim 8, wherein the file address mapping tree is updated when a block is inserted into the heap tree.

10. The system of claim 8, wherein the file address mapping tree is updated when address space is deleted by:
  deleting an associated block from the heap tree;
  reducing a size of partial blocks as needed; and
  adjusting the file address mapping tree accordingly.

11. The system of claim 8, wherein:
  (a) the request to access memory comprises a request to insert data into the file at an insertion point; and
  (b) the heap tree is configured to insert the data by:
    (i) breaking one of the memory blocks at the insertion point; and
    (ii) inserting the new data as a node in the heap tree.

12. The system of claim 7 wherein the heap tree is further configured to:
  allocate a different one or more memory blocks of a different size when the independently compressing compresses to a new size; and
  independently compress the different one or more memory blocks without compressing the entire file.

13. An article of manufacture comprising a program storage medium readable by a computer and embodying one or more instructions executable by the computer to perform a method for managing memory, the method comprising:
  breaking up an existing file into two or more memory blocks for use by an application;
  managing the two or more memory blocks as nodes in a heap tree;
  receiving a request from the application for storage;
  allocating one or more blocks in the file for use by the application; and
  independently compressing one or more of the two or more memory blocks without compressing the entire file.

14. The article of manufacture of claim 13, the method further comprising:
  receiving a request to access memory at a linear file address; and
  translating the linear file address to an appropriate heap block reference to access the memory block, wherein the translating utilizes a file address mapping tree comprising a mapping from linear file addresses to heap block references.

15. The article of manufacture of claim 14, wherein the method further comprises updating the file address mapping tree when a block is inserted into the heap tree.

16. The article of manufacture of claim 15, wherein the file address mapping tree is updated when address space is deleted by:
  deleting an associated block from the heap tree;
  reducing a size of partial blocks as needed; and
  adjusting the file address mapping tree accordingly.

17. The article of manufacture of claim 15, wherein:
  (a) the request to access memory comprises a request to insert data into the file at an insertion point; and
  (b) the method further comprises:
    (i) breaking one of the memory blocks at the insertion point; and
    (ii) inserting the new data as a node in the heap tree.

18. The article of manufacture of claim 13 wherein the method further comprises:
  allocating a different one or more memory blocks of a different size when the independently compressing compresses to a new size; and
  independently compressing the different one or more memory blocks without compressing the entire file.

* * * * *